(12) United States Patent
Suzuki

(10) Patent No.: US 7,496,027 B2
(45) Date of Patent: Feb. 24, 2009

(54) OPTICAL INFORMATION RECORDING MEDIUM, OPTICAL INFORMATION RECORDING APPARATUS, INFORMATION PROCESSING APPARATUS, OPTICAL INFORMATION RECORDING METHOD, PROGRAM AND RECORDING MEDIUM

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 415 days.

(21) Appl. No.: 11/299,667

(22) Filed: Dec. 13, 2005

(65) Prior Publication Data

US 2006/0083156 A1  Apr. 20, 2006

Related U.S. Application Data

(63) Continuation of application No. 10/940,626, filed on Sep. 15, 2004, now Pat. No. 7,020,066, which is a continuation of application No. PCT/JP2004/003079, filed on Mar. 10, 2004.

(30) Foreign Application Priority Data

Mar. 25, 2003   (JP) .............................. 2003-083929

(51) Int. Cl.
    G11B 7/24    (2006.01)
(52) U.S. Cl. .............................. 369/275.3; 369/30.11
(58) Field of Classification Search ... 369/275.1–275.5, 369/30.11, 59.25, 59.26, 47.22, 30.1, 286, 369/47.27, 94, 53.31, 59.22, 126
    See application file for complete search history.

(56) References Cited

U.S. PATENT DOCUMENTS

| 5,097,458 | A | 3/1992 | Suzuki |
| 5,161,137 | A | 11/1992 | Suzuki |
| 5,218,588 | A | 6/1993 | Suzuki et al. |
| 5,222,057 | A | 6/1993 | Suzuki et al. |
| 5,309,401 | A | 5/1994 | Suzuki |
| 5,371,726 | A | 12/1994 | Suzuki |
| 5,375,108 | A | 12/1994 | Suzuki |
| 5,442,607 | A | 8/1995 | Suzuki |
| 5,487,055 | A | 1/1996 | Suzuki |

(Continued)

FOREIGN PATENT DOCUMENTS

CN    1293810 A    1/2000

(Continued)

OTHER PUBLICATIONS

Supplementary European Search Report (2 pages), Aug. 25, 2008.

*Primary Examiner*—Ali Neyzari
(74) *Attorney, Agent, or Firm*—Dickstein Shapiro LLP

(57) ABSTRACT

An optical disk 101 includes a plurality of recording layers 102 and 103 and allows recording of information on each of the recording layers 102 and 103. A spiral guide groove having wobbles meandering in radial directions of the optical disk 101 is formed on each of the recording layers 102 and 103. Recording data can be recorded on or between the guide grooves. ADIP, which is address information embedded by wobble modulation of the guide groove, is recorded. The address information indicates positional information with respect to a radial direction of the recording layer 102 or 103 of the optical disk 101 on which the wobbles of the guide groove are formed.

8 Claims, 11 Drawing Sheets

U.S. PATENT DOCUMENTS

| | | |
|---|---|---|
| 5,521,892 A | 5/1996 | Suzuki |
| 5,604,722 A | 2/1997 | Suzuki |
| 5,631,886 A | 5/1997 | Suzuki |
| 5,881,032 A | 3/1999 | Ito et al. |
| 6,128,261 A | 10/2000 | Suzuki |
| 6,424,614 B1 | 7/2002 | Kawamura et al. |
| 6,621,780 B2 | 9/2003 | Suzuki |
| 6,636,461 B2 | 10/2003 | Tsukada et al. |
| 6,744,031 B1 | 6/2004 | Suzuki |
| 6,791,922 B2 | 9/2004 | Suzuki |
| 6,795,384 B2 | 9/2004 | Suzuki |
| 7,020,066 B2 * | 3/2006 | Suzuki .................... 369/275.3 |
| 2002/0044507 A1 | 4/2002 | Hagiwara |
| 2002/0176346 A1 | 11/2002 | Lee et al. |
| 2003/0048713 A1 | 3/2003 | Suzuki |
| 2003/0156514 A1 | 8/2003 | Suzuki |
| 2004/0037190 A1 | 2/2004 | Suzuki |
| 2004/0037192 A1 | 2/2004 | Suzuki |
| 2004/0141442 A1 | 7/2004 | Suzuki |
| 2008/0012934 A1 | 1/2008 | Sugiyama et al. |

FOREIGN PATENT DOCUMENTS

| | | |
|---|---|---|
| CN | 1293810 A | 5/2001 |
| JP | 05-101398 | 4/1993 |
| JP | 08-212561 | 8/1996 |
| JP | 08-287474 | 11/1996 |
| JP | 11-273082 | 10/1999 |
| JP | 2000-293947 | 10/2000 |
| JP | 2001-52342 | 2/2001 |
| JP | 2002-50109 | 2/2002 |
| JP | 2002-279647 | 9/2002 |
| JP | 2002-358660 | 12/2002 |
| JP | 2003-6997 | 1/2003 |
| JP | 2003-187457 | 7/2003 |
| JP | 2003-346379 | 12/2003 |
| WO | WO 97/15050 | 4/1997 |
| WO | WO 00/43996 | 7/2000 |
| WO | WO-02/29789 | 4/2002 |
| WO | WO 03/100702 A2 | 12/2003 |
| WO | WO 2004/086394 | 10/2004 |

* cited by examiner

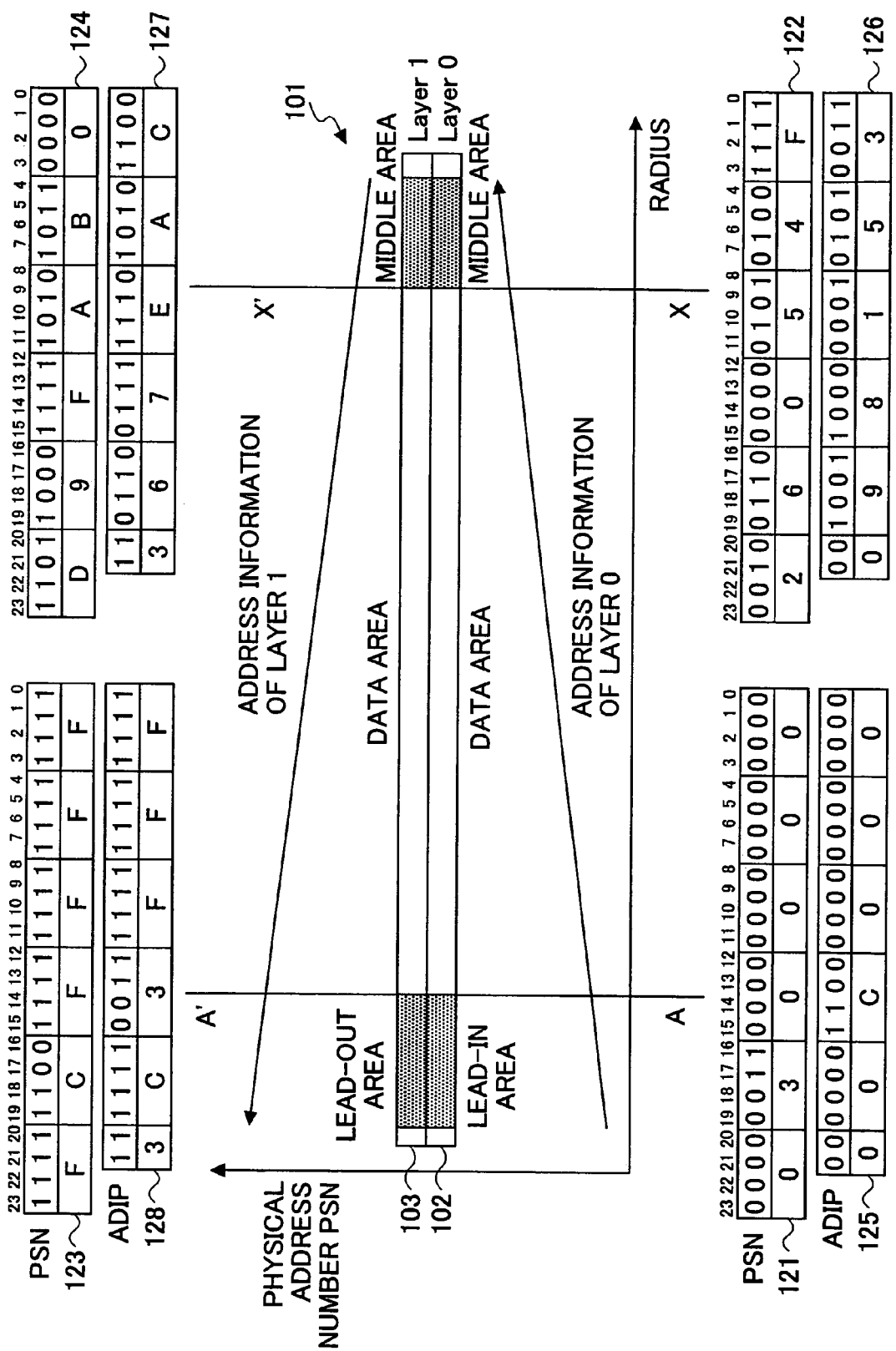

FIG.4

| PSN | 030000 | 030001 | 030002 | 030003 | 030004 | ---- | 03000B | 03000C | 03000D | 03000E | 03000F |
|---|---|---|---|---|---|---|---|---|---|---|---|
| ADIP | 00C000 | | | | 00C001 | ---- | 00C002 | | | | 00C003 |

OPTICAL INFORMATION RECORDING MEDIUM, OPTICAL INFORMATION RECORDING APPARATUS, INFORMATION PROCESSING APPARATUS, OPTICAL INFORMATION RECORDING METHOD, PROGRAM AND RECORDING MEDIUM

CROSS-REFERENCE TO RELATED APPLICATION

This application is a continuation of U.S. application Ser. No. 10/940,626, filed on Sep. 15, 2004 now U.S. Pat. No. 7,020,066, which is a U.S. continuation application filed under 35 U.S.C. §111(a) claiming the benefit under 35 U.S.C. §§120 and 365(c) of PCT application JP2004/003079, filed on Mar. 10, 2004, which claims priority to Application Ser. No. 2003-083929, filed in Japan on Mar. 25, 2003. The foregoing applications are hereby incorporated herein by reference in their entirety.

BACKGROUND OF THE INVENTION

1. Field of the Invention

The present invention relates to: an optical information recording medium having a plurality of recording layers and allowing recording of information on each of the recording layers; an optical information recording apparatus and an optical information recording method that perform data recording on the optical information recording medium; an information processing apparatus provided with the optical information recording apparatus; a program causing a computer that controls the optical information recording apparatus to perform data recording on the optical information recording medium; and a recording medium recording the program thereon.

2. Description of the Related Art

Optical disks such as DVDs can increase the total storage capacity by providing two or more recording layers. In such optical disks, recording and reproducing can be performed by accessing from a single side thereof and adjusting the focus of an optical beam of an optical head (pickup) on each of the recording layers. Thereby, it is possible to perform large volume recording and reproducing without turning over an optical disk. Especially, in DVDs, two-layer disks of a read-only type (ROM) have already been in practical use.

Japanese Laid-Open Patent Application No. 2000-293947 discloses an optical information recording medium of a multi-layer structure including a first recording layer and a second recording layer, wherein a plurality of spiral or concentric tracks are provided, and the tracks are formed by a plurality of sectors. Each of the sectors includes address information (hereinafter simply referred to as "address") of 0 through (S−1) (S is the number of sectors in the first and second recording layers) in the first recording layer and S through (S×2−1) in the second recording layer.

By the way, it is necessary for a recordable optical disk to previously embed address therein even if it is unrecorded so as to specify a current position or a recording target position. In the technique of Japanese Laid-Open Patent Application No. 2000-293947, the number of sectors in the first recording layer is set to S and address is sequentially embedded therein from 0, and the address of the second recording layer starts from S.

Japanese Laid-Open Patent Application No. 2000-293947, however, does not disclose a specific formation method for embedding address in an unrecorded optical disk. In addition, the address formation method for embedding address must be a method that does not interfere with signals of recording data after the recording data are recorded.

Further, when the number of sectors S in the first recording layer is different in each optical disk (for example, when the storage capacity per layer is different in each optical disk due to difference in the disk system or the number of tracks), it cannot be determined from which position the address in the second recording layer starts. Hence, there is a problem in that it is impossible to calculate the position of an address in a radial direction of an optical disk based only on the address in the second recording layer.

SUMMARY OF THE INVENTION

An object of the present invention is to provide an address information formation method realizing formation of address information that does not interfere recording data in an optical information recording medium in which the above-mentioned problems are eliminated.

Another object of the present invention is to provide an optical information recording medium, an optical information recording apparatus and method that can easily obtain address information of each recording layer even if the storage capacity of each recording layer is different.

In order to achieve the above-mentioned objects, according to a first aspect of the present invention, there is provided an optical information recording apparatus for recording recording data on a plurality of recording layers of an optical information recording medium, each recording layer having formed thereon a spiral guide groove having wobbles meandering in radial directions of the optical recording medium, the optical information recording apparatus comprising: a reading part that reads the wobbles of the spiral guide groove formed on each of the recording layers; an address information obtaining part that obtains address information based on the read wobbles, the address information indicating a position with respect to a radial direction of the recording layer; an access part that performs an access operation to access a predetermined position of a predetermined one of the recording layers of the optical information recording medium by using the address information; and a recording part that records the recording data on the predetermined one of the recording layers at the predetermined position.

Additionally, the above-mentioned objects can be achieved by an information processing apparatus including an optical information recording apparatus for recording recording data on a plurality of recording layers of an optical information recording medium, each recording layer having formed thereon a spiral guide groove having wobbles meandering in radial directions of the optical recording medium, the optical information recording apparatus comprising: a reading part that reads the wobbles of the spiral guide groove formed on each of the recording layers; an address information obtaining part that obtains address information based on the read wobbles, the address information indicating a position with respect to a radial direction of the recording layer; an access part that performs an access operation to access a predetermined position of a predetermined one of the recording layers of the optical information recording medium by using the address information; and a recording part that records recording data on the predetermined one of the recording layers at the predetermined position.

Additionally, the above-mentioned objects can be achieved by An optical information recording method that records recording data on a plurality of recording layers of an optical information recording medium, each recording layer having formed thereon a spiral guide groove having wobbles meandering in radial directions of the optical recording medium, the optical information recording method comprising the steps of: a reading step of reading the wobbles of the spiral guide groove formed on each of the recording layers; an address information obtaining step of obtaining address information based on the read wobbles, the address information indicating a position with respect to a radial direction of the recording layer; an access step of performing an access operation to access a predetermined position of a predetermined one of the recording layers of the optical information recording medium by using the address information; and a recording step of recording the recording data on the predetermined one of the recording layers at the predetermined position.

Additionally, the above-mentioned objects can be achieved by a program to be carried out by a computer that controls an optical information recording apparatus for recording recording data on a plurality of recording layers of an optical information recording medium, each recording layer having formed thereon a spiral guide groove having wobbles meandering in radial directions of the optical recording medium, the program causing the optical information recording apparatus to carry out the steps of: a reading step of reading the wobbles of the spiral guide groove formed on each of the recording layers; an address information obtaining step of obtaining address information based on the read wobbles, the address information indicating a position with respect to a radial direction of the recording layer; an access step of performing an access operation to access a predetermined position of a predetermined one of the recording layers of the optical information recording medium by using the address information; and a recording step of recording the recording data on the predetermined one of the recording layers at the predetermined position.

Further, in order to solve the above-mentioned objects, according to a second aspect of the present invention, there is provided an optical information recording medium comprising a plurality of recording layers for recording data, wherein a spiral guide groove having wobbles that are meandering in radial directions of the optical information recording medium is formed on each of the recording layers, and wherein address information is recorded by wobble modulation of the spiral guide groove, predetermined conversion is performed on the address information recorded on a first of the recording layers, and the converted address information is recorded on a second of the recording layers at the same corresponding position with respect to a radial direction of the optical information recording medium.

Additionally, the above-mentioned objects can be achieved by an optical information recording apparatus for recording recording data on a plurality of recording layers an optical information recording, each recording layer having formed thereon a spiral guide groove having wobbles meandering in radial directions of the optical recording medium, the optical information recording apparatus comprising: a reading part that reads the wobbles of the spiral guide groove formed on each of the recording layers; an address information obtaining part that obtains address information recorded by wobble modulation of the guide groove, the address information indicating a position with respect to a radial direction of the recording layer; a conversion part that performs predetermined conversion on address information of a first of the recording layers by using the address information so as to obtain address information of a second of the recording layers at the same corresponding position with respect to a radial direction of the optical information recording medium; an access part that performs an access operation to access a predetermined position of a predetermined one of the recording layers of the optical information recording medium by using the address information; and a recording part that records the recording data including a data address on the predetermined one of the recording layers at the predetermined position.

Additionally, the above-mentioned objects can be achieved by an optical information recording method of recording recording data on a plurality of recording layers of an optical information recording medium, each recording layer having formed thereon a spiral guide groove having wobbles meandering in radial directions of the optical recording medium, the optical information recording method comprising the steps of: a reading step of reading the wobbles of the spiral guide groove formed on each of the recording layers; an address information obtaining step of obtaining address information based on the read wobbles, the address information indicating a position with respect to a radial direction of the recording layer; a conversion step of performing predetermined conversion on address information of a first of the recording layers so as to obtain address information of a second of the recording layers at the same corresponding position with respect to a radial direction of the optical information recording medium; an access step of performing an access operation to access a predetermined position of a predetermined one of the recording layers of the optical information recording medium by using the address information; and a recording step of recording user data including a data address on the predetermined one of the recording layers at the predetermined position.

Additionally, the above-mentioned objects can be achieved by a program to be carried out by a computer that controls an optical information recording apparatus for recording recording data on a plurality of recording layers of an optical information recording medium, each recording layer having formed thereon a spiral guide groove having wobbles meandering in radial directions of the optical recording medium, the program causing the optical information recording apparatus to carry out the steps of: a reading step of reading the wobbles of the spiral guide groove formed on each of the recording layers; an address information obtaining step of obtaining address information based on the read wobbles, the address information indicating a position with respect to a radial direction of the recording layer; a conversion step of performing predetermined conversion on address information of a first of the recording layers so as to obtain address information of a second of the recording layers at the same corresponding position with respect to a radial direction of the optical information recording medium; an access step of performing an access operation to access a predetermined position of a predetermined one of the recording layers of the optical information recording medium by using the address information; and a recording step of recording the recording data including a data address on the predetermined one of the recording layers at the predetermined position.

According to the first aspect of the present invention, it is possible to provide an address information formation method capable of accessing an arbitrary position of an optical information recording medium even if recording data are not recorded thereon, and avoiding interference by address information with respect to recording data.

In addition, according to the second aspect of the present invention, even if each recording layer has a different storage capacity, by performing predetermined conversion on the address information of one recording layer, it is possible to obtain the address information of another recording layer.

Other objects, features and advantages of the present invention will become apparent from the following detailed description when read in conjunction with the accompanied drawings.

BRIEF DESCRIPTION OF THE DRAWINGS

FIG. 1 is a diagram for explaining the structure of a disk according to one embodiment of the present invention;

FIG. 4 is a diagram showing an example of the relationship between embedded address information ADIP and a physical address number PSN;

DETAILED DESCRIPTION OF THE PREFERRED EMBODIMENTS

Figure 2A:
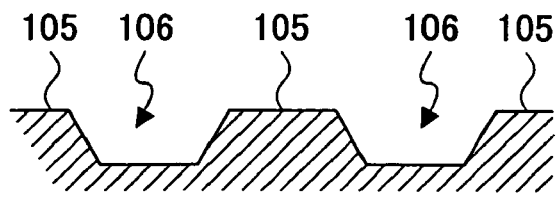
FIG. 2A and FIG. 2B are diagrams for explaining the structure of a guide groove of the disk.

A description is given below of each embodiment of the present invention.

It should be noted that, in the following description, symbols as follows are used. That is, in "12BDh", for example, the symbol "h" represents hexadecimal form. Thus, in this example, a hexadecimal numeric value "12BD" is represented. In addition, in "0010b", the symbol "b" represents binary form. Thus, in this example, a binary numeric value "0010" is represented. Further, in "1234d", the symbol "d" represents decimal form. Thus, in this example, a decimal numeric value "1234" is represented. A symbol "*" represents multiplication, and a symbol "/" represents division.

FIG. 1 is a diagram for explaining the structure of an optical disk 101 according to one embodiment of the present invention. The optical disk 101 is an optical information recording medium according to one embodiment of the present invention, and this optical disk is a DVD (Digital Versatile Disc) having two recording layers and allowing data recording on each of the recording layers.

A lower recording layer 102 of the disk 101 is referred to as a layer 0 and an upper recording layer 103 thereof is referred to as a layer 1. Generally, an optical head of an optical information recording/reproducing apparatus emits an optical beam from the lower side. Thus, when seen from the optical head, the layer 0 is arranged forward and the layer 1 is arranged backward.

Figure 2B:
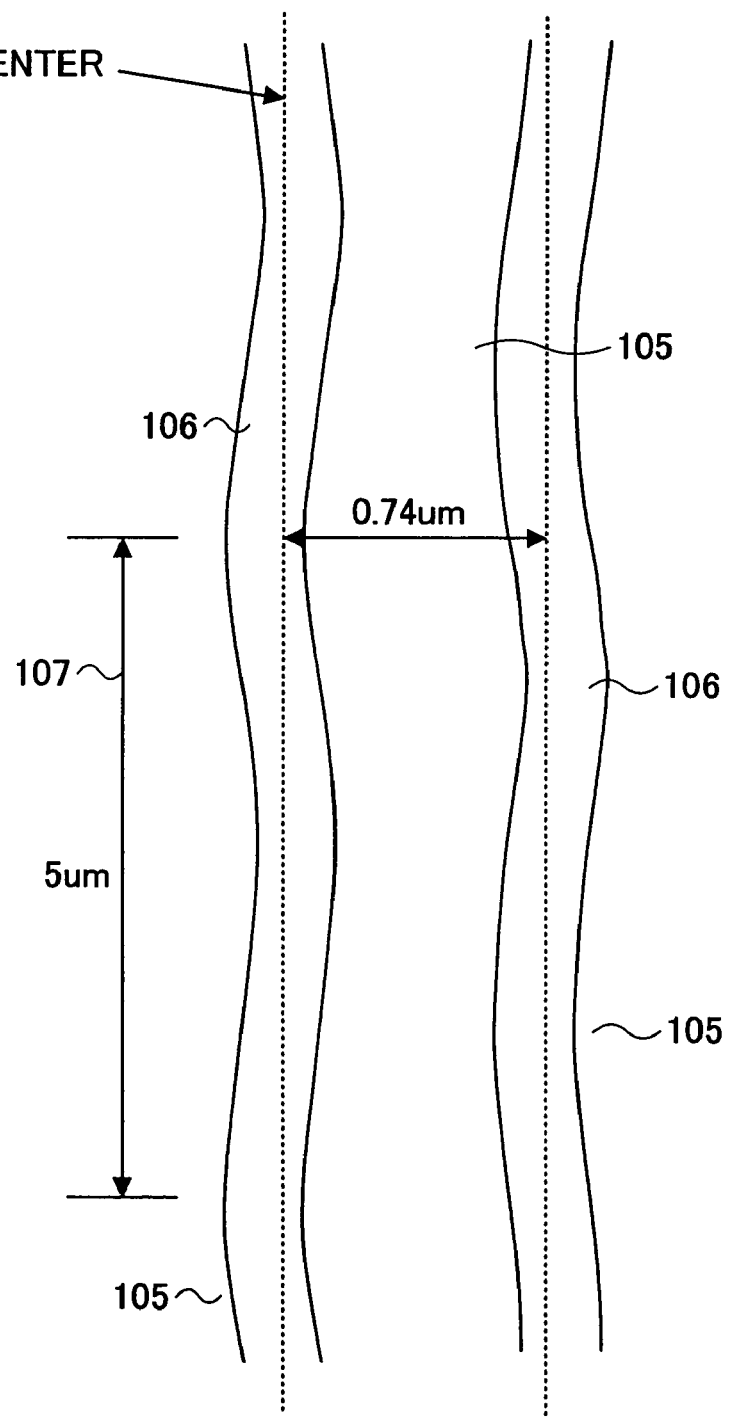

As shown in FIG. 2A and FIG. 2B, a guide groove (groove) 106 is spirally formed on the layer 0 from the inner track toward the outer track of the disk 101. Information is recorded/reproduced while the optical head follows on the guide groove 106 or between guide grooves 106. Portions 105 between the guide grooves 106 are called lands.

As shown in FIG. 2B, the guide groove 106 has a constant spiral pitch (track pitch) and is meandering in a sinusoidal manner for a minute amount in radial directions of the optical disk 101. This meandering is called wobble. The wobble amount is adequately smaller than the track pitch so as not to interfere with track tracing by the optical head and recorded data. It is preferable that the wobble amount is about 5%. That is, if the track pitch 104 is 0.74 μm, it is preferable that the meandering width (wobble amount) is about 0.03 μm. It is preferable that a cycle 107 of the wobble in a track direction is short6, since detecting resolution is improved. However, still, detection becomes impossible if a recording data signal and a frequency band interfere. Thus, the cycle 107 cannot be made excessively short. For example, about 5 μm is selected for the cycle of wobble in a track direction.

If the wobble is formed with a spatially constant cycle on average, by rotating a rotating motor of the optical information recording/reproducing apparatus, it is possible to perform CLV (constant linear velocity) control. In addition, by generating a clock signal synchronized with the wobble, it is possible to use the clock signal as a recording data clock.

The wobble of the guide groove 106 is appropriately modulated. Address information and other supplementary information may be embedded by the wobble modulation. Thereby, even in a state before recording, it is possible to search for an arbitrary position on the optical disk 101, and thus it is possible to record data at an arbitrary position.

Figure 3:
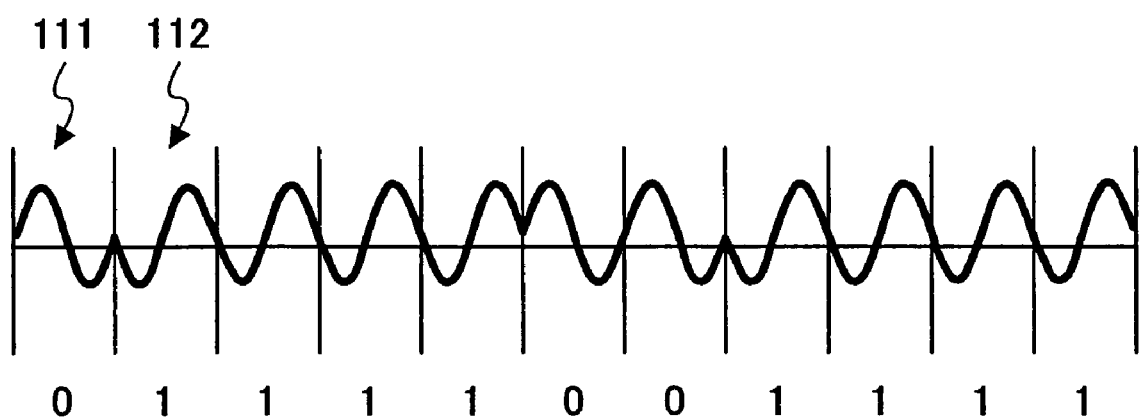
FIG. 3 is a diagram showing an example of wobble modulation of the guide groove of the disk.

FIG. 3 shows an example of the wobble modulation. In FIG. 3, the lateral direction is a line direction, and the vertical direction is a radial direction. This is an example of phase modulation: it is possible to embed digital information by handling a sine wave 111 of 0-degree phase as "0" and a sine wave 112 of 180-degree phase as "1". As for the modulation method, in addition to the phase modulation, frequency modulation or amplitude modulation may be used.

Embedding of address information by wobble modulation of a guide groove as mentioned above or the embedded address information is called ADIP (ADdress In Pre-groove). FIG. 4 is an explanatory diagram showing an example of the relationship between the ADIP, which is the address information, and a physical address number PSN (Physical Sector Number) of recording data. Generally, the ADIP is created such that the ADIP does not interfere with recording data. Hence, it is difficult or impossible to make recording density high. Accordingly, a single address number is represented by several sectors of the PSN. In the example of FIG. 4, a single ADIP address is represented by four sectors (PSN). Thus, an ADIP is expressed with a word length shorter than that of an address of recording data.

Additionally, in DVDs, an ECC (Error Correction Code) is added to recording data, and the unit thereof is 16 physical sector PSN length. Hence, data recording is also performed in units of 16 PSNs, which is called an ECC block (16 PSN).

Figure 5:
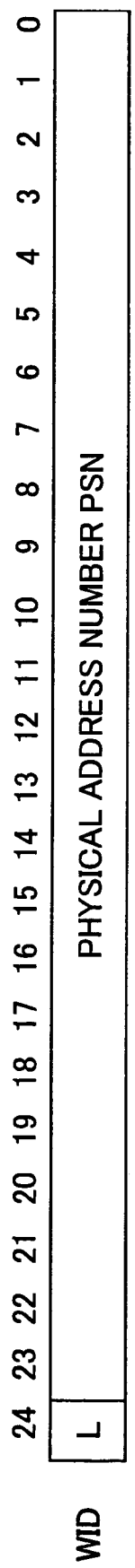
FIG. 5 is a diagram showing a format WID of an address part of recording data.

FIG. 5 is a diagram showing a format of an address part of recording data. This is called a WID (Write sector ID). 24 bits (bit0-bit23) are allocated to a physical address number PSN, and 1 bit is allocated to layer information indicating whether a recording layer is the layer 0 or the layer 1. The layer information is called L bit. By adding the L bit, it is possible to allocate PSNs to each of two recording layers. However, the L bit is not required for address allocation in the format (inverse-spiral) as shown in FIG. 1.

Figure 6:
FIG. 6 is a diagram showing a format AID of the embedded address information ADIP.

FIG. 6 is an address format of the ADIP, which is called an AID (ADIP ID). 22 bits (bit0-bit 21) are allocated to an ADIP address and 1 bit is allocated to the layer information L bit. By adding the L bit, it is possible to allocate ADIP addresses to each of the two recording layers. However, the L bit is not required for address allocation of the format (inverse-spiral) as shown in FIG. 1.

As shown in FIG. 1, the first layer (layer 0) of the optical disk 101 is a reference layer, which serves as the reference for each layer. The direction of the spiral of the guide groove 102 is from the inner track toward the outer track of the optical disk 101. The physical address number PSN of recording data in a data area begins with 030000h and the outermost track position is 26054Fh (codes 121 and 122).

In the first layer (layer 0) of the optical disk 101, the portion inner than the innermost position 030000h of the data area is a lead-in area, where dummy data or supplementary data other than user data are recorded. The position outer than the outermost position 26054F is a middle area, where dummy data are recorded. The dummy data include at least a PSN. When the optical head accesses the user data area, in some cases, the optical head may transitionally land outside the user data area due to positioning error or decentering of the disk. Hence, in order to specify the current position of the optical head, the dummy data are provided in the area somewhat wider than the user data area.

In the second layer (layer 1) of the optical disk 101, the direction of the spiral of the guide groove 103 is opposite to the direction in the layer 0: from the outer track toward the inner track. Such a format method is called an OTP (Opposite Track Path) method. In the OTP method, in the case of sequentially recording or reproducing, for example, video data, when the optical head moves to the layer 1 after recording/reproducing to the outermost track of the layer 0, the optical head to temporarily moves to the inner track portion of the optical disk 101. For this reason, it is possible to perform recording/reproducing with minimum access time period. Accordingly, it is possible to avoid discontinuity of images due to a long access time period. In the OTP method, at the time of sequential recording/reproducing, the optical head moves to the outermost track of the layer 1 after the outermost track of the layer 0, and then performs track tracing toward the inner tracks of the layer 1.

The PSNs of the layer 1 of the optical disk 1 according to the OTP method are address information obtained by performing predetermined conversion (for example, bit inversion) on the PSNs of the layer 0 at the same radial position. That is, the PSN of the layer 0: the position 030000h (code 121) is FCFFFFh (code 123) in the layer 1. In a case where bit 23 is a code bit and represented by a complement of 2, −030000h (minus 030000h) is FD0000h. Thus, the difference is only 1h. Accordingly, bit inversion may be said as almost code conversion when expressed with a complement of 2.

The PSN of the layer 1 corresponding to the outermost track position of the layer 0: 26054h (code 122) is D9FAB0 (code 124). Thus, the PSN of the data area of the layer 1 is increased from the D9FAB0h to FCFFFFh.

In the optical disk 101 of FIG. 1, the ADIP of the layer 0 begins with the innermost track position of the data area, 00C000h (code 125), which is the value obtained by dividing the PSN by 4. This is because, as described above with reference to FIG. 4, a single ADIP is formed by 4 PSNs.

Similarly, the ADIP of an arbitrary position in the data area is "PSN/4". The ADIP corresponding to the outermost track PSN of the layer 0: 26054Fh (code 122) is 098153h (code 126). In addition, the ADIP corresponding to the outermost track PSN of the layer 1: D9FAB0h (code 124) is 367EACh (code 127), and the ADIP corresponding to the innermost track PSN: FCFFFFh (code 123) is 3F3FFFh (code 128).

The ADIP corresponding to the outermost track PSN of the layer 1: D9FAB0h (code 124) is 367EACh (code 127), which is the value obtained by bit inversion of the ADIP of the layer 0: 098153h (code 126). That is, if the bit 21 of an ADIP is handled as a code bit and represented by a complement of 2, the value obtained by subtracting 1 from the negative number of the ADIP of the layer 0: 098153h (code 126), −098153h, is 367EACh (code 127). Thus, the difference is only 1h. Accordingly, in access operation, it may be handled as code conversion.

As mentioned above, the ADIPs of the layer 1 of the optical disk 101 according to the OTP method are address information obtained by bit inversion (or code conversion) of the ADIPs of the layer 0 at the same radial positions. Further, the ADIP of an arbitrary position is 2-bit shorter than recording data PSN word length, and the relationship "ADIP=PSN/4" (shifted for 2 bits to the right) is established. Thus, by performing predetermined conversion (here, calculation of division by 4 or multiplication by 4), it is possible to easily obtain one of an ADIP and a PSN from the other.

Figure 7:
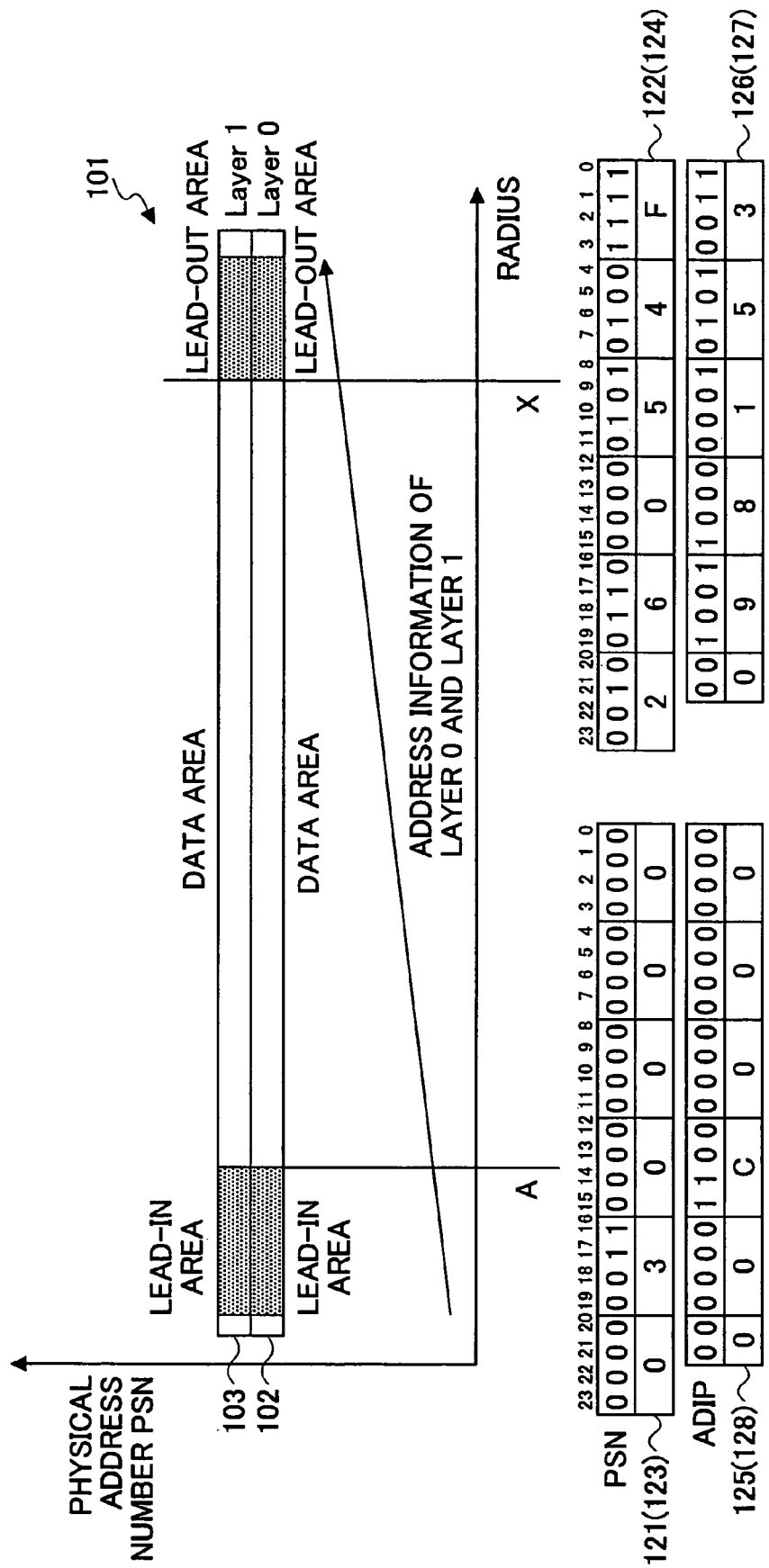
FIG. 7 is a diagram for explaining the structure of a disk according to another embodiment of the present invention.

Next, referring to FIG. 7, a description is given of another structure of the optical disk 101.

It should be noted that those parts that are the same as those corresponding parts of the optical disk 101 described with reference to FIG. 1 through FIG. 6 are described by using the same reference numerals.

Describing mainly of the differences with the optical disk 101 of FIG. 1 through FIG. 6, in the optical disk 101 of FIG. 7, the spiral direction of the guide groove 106 of the layer 1 is the same as that in the layer 0. Such a format method of the optical disk 101 is called a PTP (Parallel Track Path) method. The forms of wobble and ADIPs are the same as those of the optical disk 101 according to the above-mentioned OTP method, and a detailed description thereof is omitted.

In the optical disk 101 according to the PTP method, PSNs and ADIPs (ADIP=PSN/4) are the same in both layer 0 and layer 1 at the same radial position. The portion inner than the PSN of the innermost track position of a data area: 030000h is called a lead-in area, and the portion outer than the PSN of the outermost track position: 26054Fh is called a lead-out area, the contents of which are supplementary data or dummy data. The role of the dummy data are the same as that described with respect to the optical disk 101 according to the OTP method.

As described with reference to FIG. 5 and FIG. 6, in the optical disk 101 (FIG. 7) according to the PTP method, in order to determine whether a recording layer is the layer 0 or the layer 1, the L bit is provided in addition to PSNs. Thereby, even in the optical disk 101 having a different storage capacity for each recording layer, it is possible to easily determine a recording layer by determination based on the L bit.

Next, a description is given of an optical information recording/reproducing apparatus 1 according to one embodiment of the present invention, which apparatus records/reproduces information on/from the optical disk 101.

Figure 8:
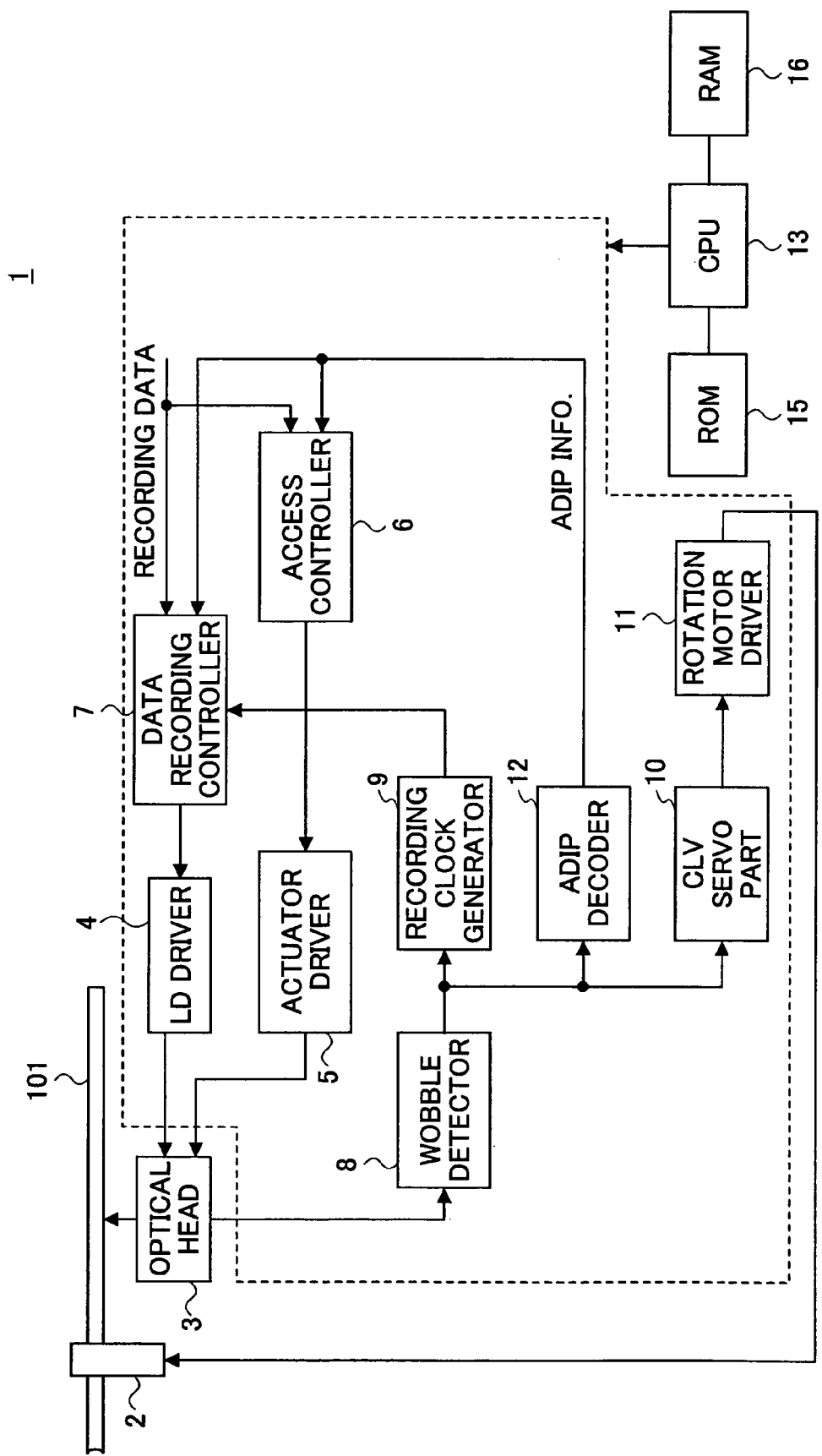
FIG. 8 is a block diagram showing the structure of an optical information recording/reproducing apparatus according to one embodiment of the present invention.

FIG. 8 is a block diagram showing a general structure of the optical information recording/reproducing apparatus 1. As shown in FIG. 8, the optical information recording/reproducing apparatus 1 embodies an optical information recording apparatus according to the present invention, and performs recording and reproducing of information with respect to the above-mentioned optical disk 101 and/or other optical disks.

The optical disk 101 can be replaced by a loading mechanism that is not shown.

In the optical information recording/reproducing apparatus 1 of FIG. 8, a rotation motor 2 rotates the optical disk 101.

An optical head 3 includes, for example: a laser diode (LD) that is a laser light source for recording/reproducing; an optical system having an objective lens for focusing a laser light on the optical disk 101 to form an optical spot and detecting the reflected light; a photo detector that converts the reflected light into an electric signal by means of a photoelectric transfer unit divided into a plurality of portions; a lens actuator that moves the objective lens in the focal direction and radial directions so as to follow the focus and the guide groove of each recording layer of the optical disk 101; and a head actuator for moving the optical head 3 in radial directions of the optical disk 101 (each of these is not shown). Since these are known structures, a description thereof is omitted.

An LD driver 4 performs data recording by modulating the LD of the optical head 3 in accordance with recording data.

An actuator driver 5 drives the lens actuator and the head actuator by known focus tracing and guide groove tracing means (not shown), thereby performing a focus servo operation and a guide groove tracing servo operation. In addition, the actuator driver 5 drives the lens actuator and the head actuator in accordance with an instruction of an access controller 6, thereby moving the optical spot of the optical head 3 to a target position (a radial position and the kind of a recording layer) of the optical disk 101 to which recording data are to be written.

A data recording controller 7 compares a target address to which recording data (Write Data) to be recorded are to be written and the corresponding position on the optical disk 101. When there is a match, the recording controller 7 delivers the recording data to the LD driver 4 (a detailed operation will be described later).

A wobble detector 8 detects a wobble component of the guide groove 106 of the optical disk 101 from a signal of the photo detector of the optical head 3. Specifically, a first-order diffraction light of the reflected light of the optical spot is detected by each of at least two photo detectors divided along the guide groove 106. The difference signal based on the two photo detectors is called a Push-Pull signal, which is a signal reflecting the wobble component. An output signal may be, for example, a signal having the waveform as shown in FIG. 3.

A recording clock (Write Clock) generator 9 generates a clock signal that is phase-synchronized with a wobble signal. Specifically, the recording clock generator 9 is formed by a PLL circuit generating a clock signal that is several times the wobble signal. By supplying the recording data to the LD driver 4 from the recording clock generator 9 based on the clock signal, it is possible for the optical head 3 to write the recording data at an accurate position on the optical disk 101.

A CLV (Constant Linear Velocity) servo part 10 compares the wobble signal and a reference signal (not shown), and controls a rotation motor driver 11 in accordance with the comparison result, thereby driving the rotation motor 2. The wobble of the guide groove 106 is formed on the optical disk 101 with a constant spatial frequency. Hence, CLV (Constant Linear Velocity) control is realized by accurate rotation of the rotation motor 2 in synchronization with the wobble signal.

An ADIP decoder 12 demodulates a modulation component of the wobble signal and generates ADIP information. The ADIP information is decoded in the format of, for example, that shown in FIG. 6 and FIG. 4. The detected ADIP information is output to the data recording controller 7 and the access controller 6 as current address information of the optical disk 101.

The access controller 6 compares a target address indicated by recording data and the current address of the optical disk 101 detected by the ADIP decoder 12, and delivers a move instruction to the actuator driver 5 such that the optical spot focused by the optical head 3 becomes close to the target address.

Based on, for example, a control program recorded in the ROM 15, the CPU 13 performs central control of the optical information recording/reproducing apparatus 1 while using the RAM 16 as its working area.

Figure 9:
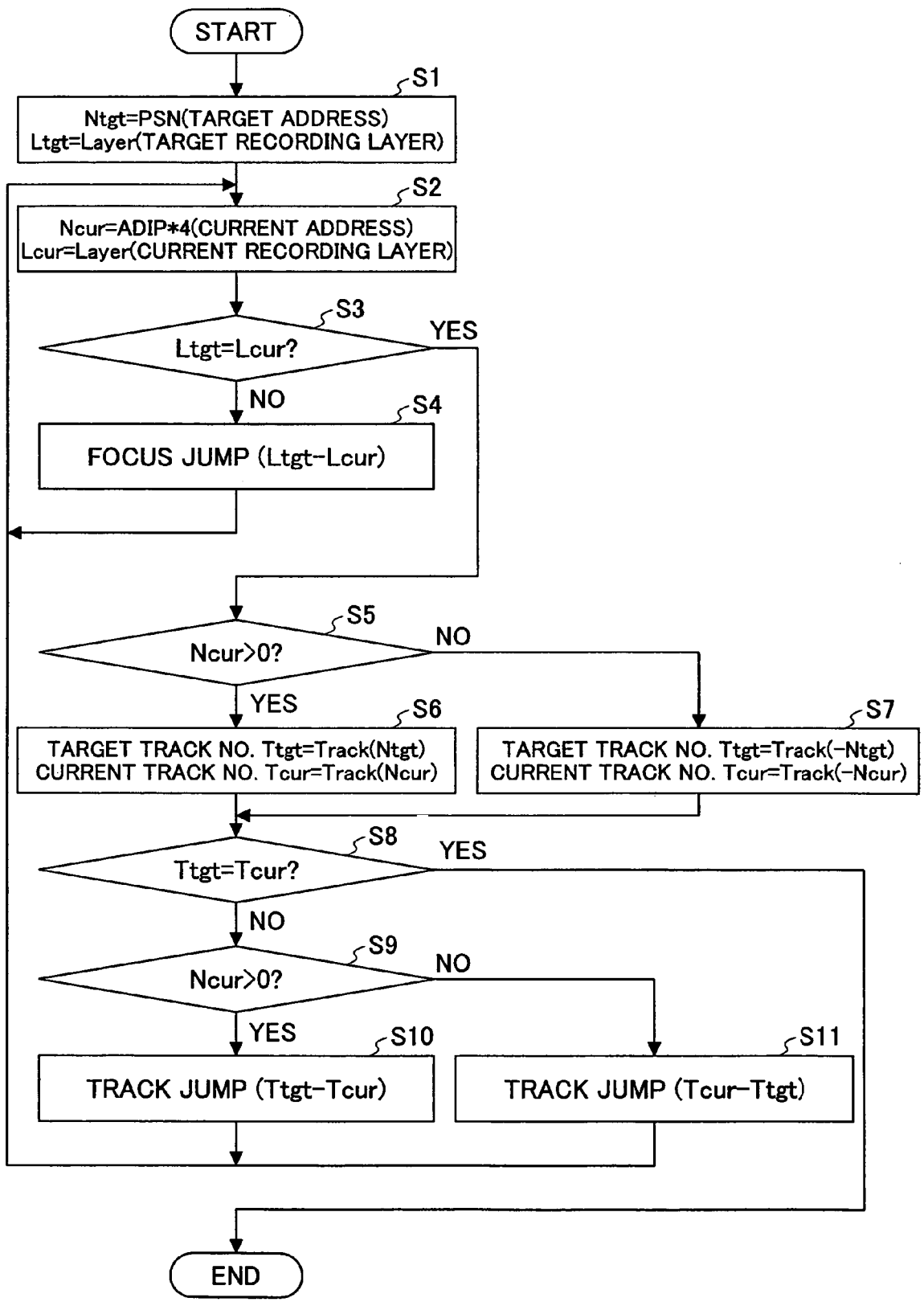
FIG. 9 is a flowchart for explaining an access operation of the optical information recording/reproducing apparatus of FIG. 8.

FIG. 9 is a flowchart for explaining an access operation to the optical disk 101 performed by the access controller 6 based on control by the CPU 13.

First, the CPU 13 extracts as Ntgt a target address (PSN), which indicates a target position on the optical disk 101 to which target position recording data (write data) are to be written.

The suffix "tgt" represents "target". In addition, a target recording layer is extracted as Ltgt, which indicates a recording layer of the optical disk 101 to which recording layer recording data are to be written (step S1).

The target address and recording layer may be instructed by an upper apparatus (an information processing apparatus 51 described later) separately from recording data, or embedded in a signal sequence of the recording data.

Next, under an instruction of the CPU 13, the access controller 6 extracts from ADIP data from the ADIP decoder 12 a current address Ncur and a current recording layer Lcur captured by the optical head 3 (step S2). The suffix "cur" represents "current".

That is, the CPU 13 detects a wobble component (wobble) of the guide groove 106 of the optical disk 101 from an output signal of the photo detector of the optical head 3 by means of the wobble detector 8 (wobble reading), and demodulates ADIP data that are modulated on the wobble component by, for example, phase modulation, frequency modulation, or amplitude modulation (obtain address information).

Here, it is assumed that four times an address indicated by the ADIP data is Ncur. This is because an ADIP address is "PSN/4" as mentioned above. In addition, this is for aligning the units of the current address Ncur for comparison with the PSN, which is the target address.

In the case where the optical disk 101 is according to the OTP method, by handling bit 21 of an ADIP address as a code bit, the current recording layer Lcur can be determined as the layer 0 when the code bit is 0. Thus, in this case, "Lcur=0" is set. When the bit 21 is 1, which indicates a negative number, the current recording layer is determined to be the layer 1 and "Lcur=1" is set.

In the case where the optical disk 101 is according to the PTP method, the Lbit, which is added in the AID, is substituted for Lcur.

Next, it is determined whether the target recording layer Ltgt is identical to the current recording layer Lcur (step S3). If so, the process proceeds to step S5, and if not, the process proceeds to step S4.

In step S4, Lcur is subtracted from Ltgt, and based on the difference, the direction and number of jumps among the recording layers are determined, and jump (focus jump) between the recording layers is performed.

For example, the direction in the case where the difference between Ltgt and Lcur is positive and the layer number is increased (in the optical disk 101 of FIG. 1, jump to the recording layer in the upward direction) is determined in advance. That is, if "Ltgt=1, Lcur=0", then "Ltgt−Lcur=1". Thus, focus jump is performed in the upward direction for one recording layer. If "Ltgt=0, Lcur=1", then "Ltgt−Lcur=−1". Thus, focus jump is performed in the downward direction for one recording layer. Even if there are many layers, i.e., three or more recording layers, the direction and number of focus jumps can be determined in a similar manner.

Particularly, the above-mentioned focus jump among recording layers is performed by shifting the focus to another layer by driving the objective lens of the optical head 3 in the upward/downward directions. Since such a method is known, a description thereof is omitted.

After performing the focus jump in step S4, step S2 and the subsequent processes are repeated again. In the aforementioned manner, the focus jump is repeated until the current recording layer Lcur matches the target recording layer Ltgt. After exiting from the focus jump loop, the process proceeds to step S5.

In step S5, whether the current address Ncur is a positive number is determined. The code is represented by the most significant bit 23, which corresponds to the bit 21 of the original ADIP.

In the case where the optical disk 101 is according to the OTP method, it can be determined that, when the current address Ncur is a negative number, the ADIP address is the reverse spiral of the layer 1, and when the current address Ncur is a positive number, the ADIP address is a positive spiral of the layer 0. Additionally, in the case where the optical disk 101 is according to the PTP method, both layer 0 and layer 1 are always positive numbers and positive spirals. Accordingly, in both the OTP method and the PTP method, it can be determined as a positive spiral when Ncur is a positive number, and a negative spiral when Ncur is a negative number.

In steps S6 and S7, calculations for converting an address to a track number T are performed. The track number indicates the number of the guide groove 106, which is incremented by 1 for each circuit while taking a track having the position of PSN: 030000h as 0. In a disk having a constant linear density such as a CLV format, the number of tracks T at an arbitrary PSN can be calculated from a track pitch Tp and the length a of a single sector.

For example, the track number T can be calculated by the following equation (1).

$$T = sqrt((PSN - 030000h)*a*Tp/pi + r0^2)/Tp - r0/Tp \quad (1)$$

(where a: physical sector length, r0: the radius of the optical disk 101 at the time when the PSN is located at 030000h, sqrt( ): square root, and pi: circle ratio)

In step S6, since it is a positive spiral, the numbers of tracks on which the target address Ntgt and the current address Ncur are located are calculated by using the equation (1). It is assumed that the number of the target track on which Ntgt is located is Ttgt, and the number of the current track on which Ncur is located is Tcur.

In step S7, since it is a negative spiral, calculations similar to those in the case of a positive spiral can be performed by converting the current address by code conversion (or, bit inversion). Thus, the current track number Tcur is calculated by using the equation (1) by taking the current address as −Ncur.

It is desirable that an instruction of a target position of recording data is expressed in the format the same as that of the target address. The target track number Ttgt is obtained by conversion by code conversion (or bit inversion) in a similar manner.

In step S8, the target track number Ttgt is compared with the current track number Tcur. When these match, the current position of the optical head 3 is within a track circuit in which the target sector is located. Hence, movement in a radial direction of the optical disk 101 is not required, and the current track may be simply traced until the target address is reached. Thus, the series of access operation ends.

When there is no match in step S8 (NO), whether the current address Ncur is positive is determined again (step S9). When positive (YES), since it is a positive spiral, the process proceeds to step S10. When negative (NO), since it is a reverse spiral, the process proceeds to step S11.

In steps S10 and S11, the optical head is moved in a radial direction of the optical disk 101 for the number of "Ttgt−Tcur", which is the difference between the track numbers. This is called track jump. It is assumed that, for example, the jump direction is positive in the direction toward the outer tracks of the optical disk 101.

In step S10, since it is the case of a positive spiral, when Ttgt is greater than Tcur, movement should be made in the direction toward the outer tracks of the optical disk 101. Track jump of the optical head is performed for the number of tracks of "Ttgt−Tcur". If "Ttgt>Tcur", then the result is positive. Thus, the jump direction is toward the outer tracks.

In step S1, since it is the case of a reverse spiral, when Ttgt is greater than Tcur, movement should be made in the direction toward the inner tracks of the optical disk 101. Track jump of the optical head is performed for the number of tracks of "Tcur−Ttgt". If "Ttgt>Tcur", then the result is negative. Thus, the jump direction is toward the inner tracks.

After such track jump (Step S10, S11), the process returns to step S2 again and the current address is confirmed. This is because, in some cases, there may be an error in the jump direction and approximation is performed by repetition. At the stage where the access operation ends in the aforementioned manner, the current position is located within one circuit from the target sector.

Figure 10:
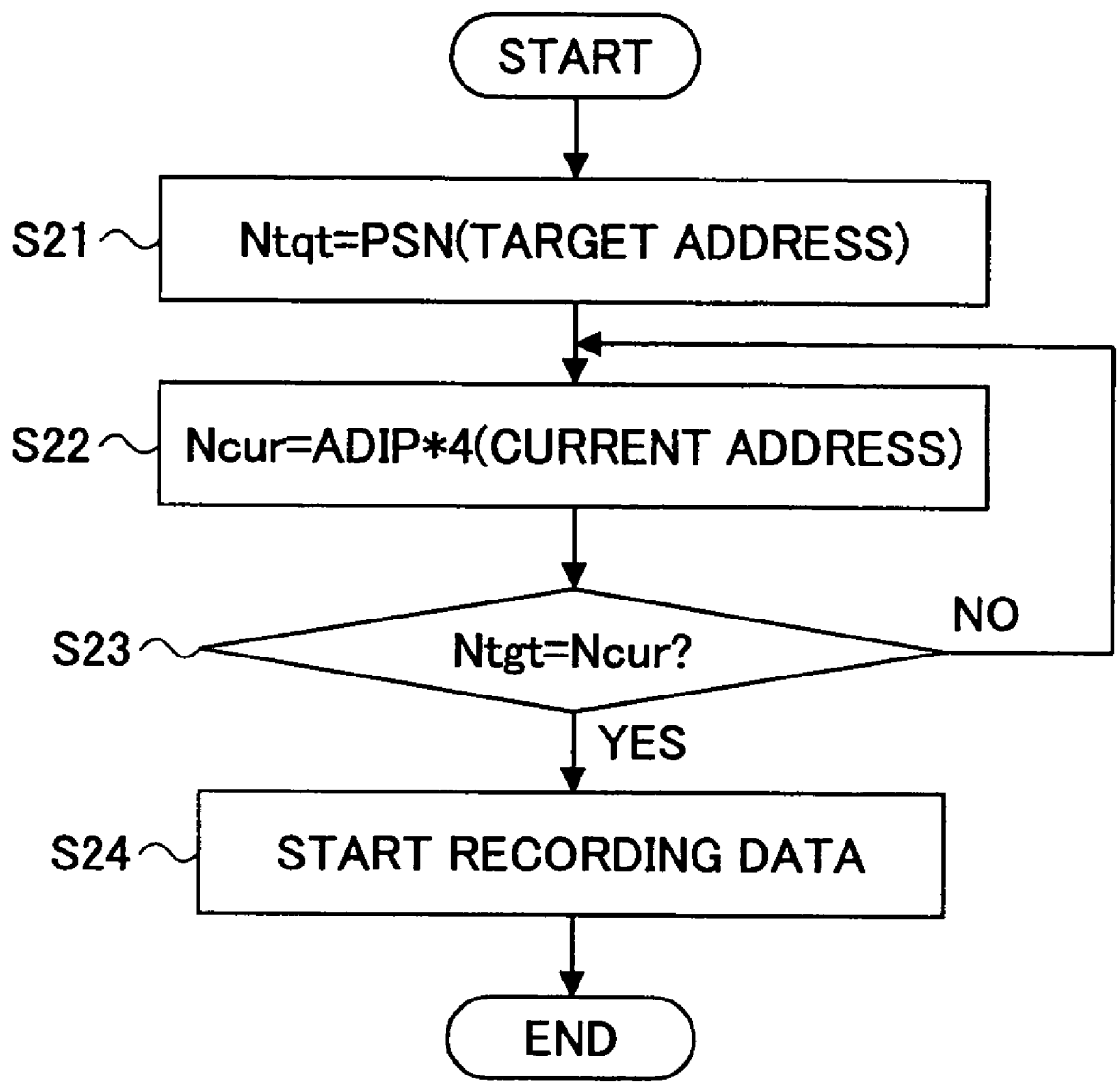
FIG. 10 is a flowchart for explaining a recording operation of the optical information recording/reproducing apparatus of FIG. 8.

FIG. 10 is a flowchart for explaining a recording operation of the data recording controller 7 based on control by the CPU 13.

The recording operation of FIG. 10 starts at the time when the access operation of FIG. 9 by the access controller 6 is completed. First, the CPU 13 extracts as Ntgt an address (PSN) on the optical disk 101, which becomes a target to which recording data are to be recorded (step S21).

The target address may be instructed by the upper apparatus (the information processing apparatus 51 described later) separately from recording data, or embedded in a signal sequence of recording data.

Next, the current address Ncur of the optical head 3 is extracted from the ADIP data from the ADIP decoder 12 (step S22). Also in this case, Ncur is four times an ADIP address. This is because an ADIP address is "PSN/4" as mentioned above, and it is necessary to align the units for comparison with a target PSN.

Next, it is determined whether the current address Ncur matches the target address Ntgt (step S23). When there is a match (YES), the process proceeds to step S24. When there is no match (NO), the process returns to step S22, and the next ADIP address is detected.

The above-mentioned processes are repeated or looped until the current address Ncur matches the target address Ntgt.

In the determination of step S23, when the current address Ncur matches the target address Ntgt, delivery of recording data is started and recording of the recording data on the optical disk 101 is started by the LD driver 4 and the optical head 3 (step S24).

Figure 11:
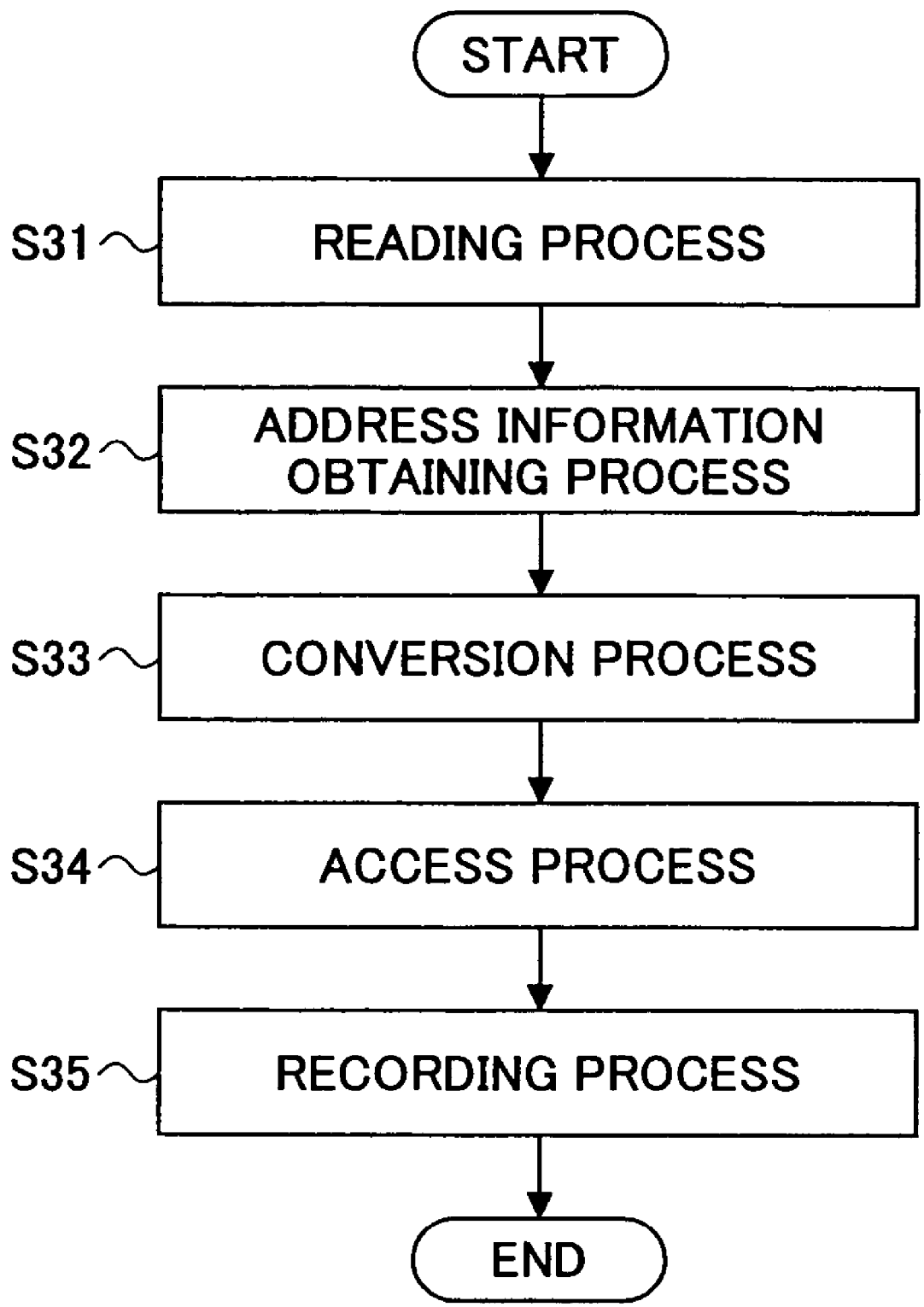
FIG. 11 is a flowchart for explaining an optical information recording/reproducing method according to one embodiment of the present invention.

FIG. 11 is a flowchart for explaining an optical information recording method carried out by the optical information recording/reproducing apparatus 1. Although details of the optical information recording method is as described above with reference to FIG. 9 and FIG. 10, the outline is described with reference to the flowchart of FIG. 11.

First, in the processes of FIG. 11, the CPU 13 detects a wobble component of the guide groove 106 of the optical disk 101 from a signal of the photo detector of the optical head 3 by means of the wobble detector 8 (wobble reading) (step S31).

Next, ADIP data modulated on the wobble component by, for example, phase modulation are demodulated (obtain address information) (step S32).

Next, by using the address information obtained in step S32, predetermined conversion is performed on the address information of one of the two recording layers of the optical disk 101, thereby obtaining the address information of the other of the recording layers corresponding to an identical position with respect to a radial direction of the disk (step S33). For example, ADIP data of the layer 1 may be obtained by performing predetermined conversion such as bit inversion or code conversion on ADIP data of the layer 0 of the optical disk 101 at an identical position with respect to a radial direction.

By using the ADIP data obtained in the aforementioned manner, according to the processes of FIG. 9, the access operation of the optical head 3 to a predetermined position on a recording layer of the optical disk 101 is performed (step S34).

At the last, according to the processes of FIG. 10, recording data are recorded on the recording layer of the accessed position (step S35).

Figure 12:
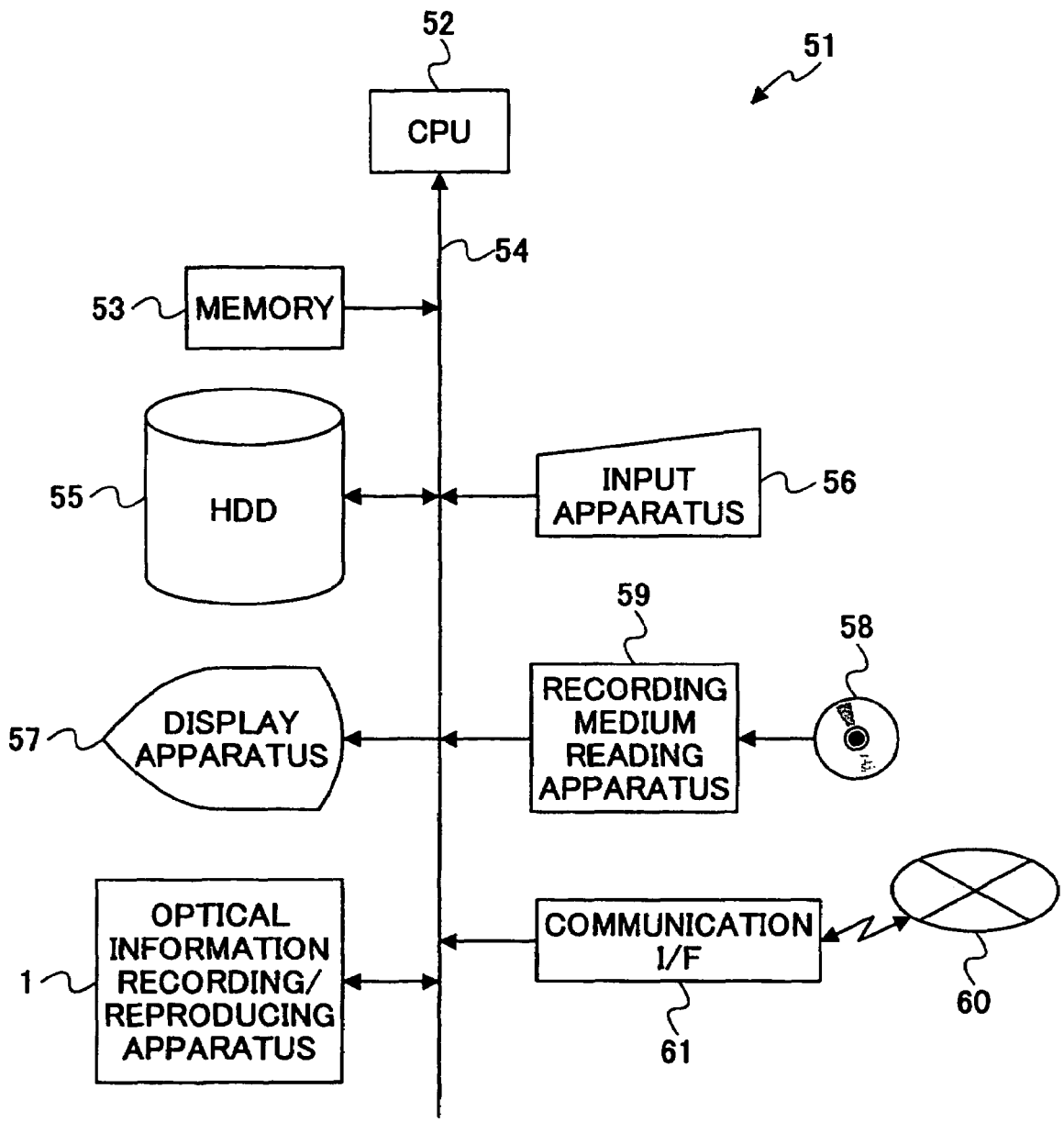
FIG. 12 is a block diagram showing the structure of an information processing apparatus according to one embodiment of the present invention.

FIG. 12 is a block diagram for explaining a structure of the information processing apparatus 51 according to one embodiment of the present invention.

As shown in FIG. 12, the information processing apparatus 51 is formed by a computer such as a personal computer and performs various calculations. A CPU 52, which performs central control of each part, is connected via a bus 54 with a memory 53 formed by, for example, various ROMs or RAMs.

Further, a magnetic recording apparatus 55 such as a hard disk; an input apparatus 56 formed by, for example, a mouse and a keyboard; a display apparatus 57 such as a LCD or a CRT; a recording medium reading apparatus 59 reading a recording medium 58 such as an optical disk; the optical information recording/reproducing apparatus 1; and a predetermined communication interface 61 performing communications with a network 60 are connected to the bus 54 via predetermined interfaces.

The communication interface 61 is connectable to a WAN such as the Internet via the network 60. Various media, for example: an optical disk such as a CD or a DVD, a magnetic optical disk, and a flexible disk may be used as the recording medium 58.

Particularly, an optical disk drive, a magnetic optical disk drive, or a flexible disk drive, for example, is used as the recording medium reading apparatus 59 in accordance with the kind of the recording medium 58.

The recording medium reading apparatus 59 and the optical information recording/reproducing apparatus 1 are separately shown. However, the recording medium reading apparatus 59 and the optical information recording/reproducing apparatus 1 may be formed as the same apparatus.

In the above description of the optical information recording/reproducing apparatus 1, it is assumed that the processes of FIG. 9 and FIG. 10 are carried out by the control of the CPU 13. However, the processes of FIG. 9 and FIG. 10 may be realized by control carried out by the information processing apparatus 51 in accordance with a control program recorded in the magnetic recording apparatus 55.

In this case, the control program recorded in the magnetic recording apparatus 55 may form a program according to one embodiment of the present invention. In addition, the recording medium 58 may form a recording medium according to one embodiment of the present invention. The above-mentioned control program is a program installed in the magnetic recording apparatus 55 by reading from the recording medium 58 by means of the recording medium reading apparatus 59 or downloading from a WAN such as the Internet. With this installation, the information processing apparatus 55 becomes possible to perform the above-mentioned control.

Further, the control program may be operated on a predetermined OS. Additionally, the control program may form a part of specific application software.

What is claimed is:

1. An optical information reproducing apparatus for reproducing data recorded on at least first and second recording layers of a multilayer information recording medium, each of the first and second recording layers having formed thereon a spiral groove having a wobble, the optical information reproducing apparatus comprising:

an address information obtaining part that obtains address information from said spiral groove, the address information being recorded as a modulation of said wobble and including position information with respect to a layering direction of the optical recording medium so that the address information including the position information of said first recording layer in the layering direction is defined by applying a predetermined conversion to the address information of said second recording layer;

an access part that performs an access operation by using the address information; and a reproducing part that reproduces information recorded by the spiral groove after the access operation.

2. The optical information reproducing apparatus as claimed in claim 1, wherein the predetermined conversion is bit inversion.

3. An optical information recording apparatus for recording data on at least first and second recording layers of a multilayer information recording medium, each of the first and second recording layers having formed thereon a spiral groove having a wobble, the optical information recording apparatus comprising:

an address information obtaining part that obtains address information from said spiral groove on said second recording layer, the address information being recorded as a modulation of said wobble and including position information with respect to a layering direction of layers of the optical recording medium so that the address information including the position information of said first recording layer in the layering direction is defined by applying a predetermined conversion to the address information of said second recording layer;

an access part that performs an access operation by using the address information; and a recording part that records information by the spiral groove after the access operation.

4. The optical information recording apparatus as claimed in claim 3, wherein the predetermined conversion is bit inversion.

5. An optical information reproducing method that reproduces data recorded on at least first and second recording layers of a multilayer information recording medium, each of the first and second recording layers having formed thereon a spiral groove having a wobble, the optical information reproducing method comprising the steps of:

an address information obtaining step of obtaining address information from said spiral groove on said second recording layer, the address information being recorded as a modulation of said wobble and including position information with respect to a layering direction of layers of the optical recording medium so that the address information including the position information of said first recording layer in the layering direction is defined by applying a predetermined conversion to the address information of said second recording layer;

an access step of performing an access operation by using the address information; and a reproducing step of reproducing information recorded by the spiral groove after the access operation.

6. The optical information reproducing method as claimed in claim 5, wherein the predetermined conversion is bit inversion.

7. An optical information recording method that records data on at least first and second recording layers of a multilayer information recording medium, each of the first and second recording layers having formed thereon a spiral groove having a wobble, the optical information recording method comprising the steps of:

an address information obtaining step of obtaining address information from said spiral groove on said second recording layer, the address information being recorded as a modulation of said wobble and including position information with respect to a layering direction of layers of the optical recording medium so that the address information including position information of said first recording layer in the layering direction is defined by applying a predetermined conversion to the address information of said second recording layer;

an access step of performing an access operation by using the address information; and a recording step of recording information by the spiral groove after the access operation.

8. The optical information recording method as claimed in claim 7, wherein the predetermined conversion is bit inversion.

* * * * *